United States Patent
Yoshiya et al.

(10) Patent No.: US 7,765,452 B2
(45) Date of Patent: Jul. 27, 2010

(54) DISK CONTROLLER

(75) Inventors: Yukihiro Yoshiya, Kawasaki (JP); Tadashi Hirano, Kahoku (JP); Yuji Noda, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 971 days.

(21) Appl. No.: 11/529,760

(22) Filed: Sep. 29, 2006

(65) Prior Publication Data

US 2007/0124650 A1 May 31, 2007

(30) Foreign Application Priority Data

Nov. 16, 2005 (JP) ............................. 2005-331122

(51) Int. Cl.
*H03M 13/00* (2006.01)
(52) U.S. Cl. ...................... 714/755; 714/710; 714/764; 714/784
(58) Field of Classification Search ................. 714/755, 714/710, 763, 718, 764, 769, 770, 777, 782, 714/784; 711/108, 112
See application file for complete search history.

(56) References Cited

U.S. PATENT DOCUMENTS

| | | | | |
|---|---|---|---|---|
| 4,525,839 A * | 6/1985 | Nozawa et al. | ............... | 714/710 |
| 5,127,088 A * | 6/1992 | Takaki | ......................... | 711/112 |
| 6,397,289 B1 * | 5/2002 | Sakai | ............................. | 711/1 |
| 6,421,758 B1 * | 7/2002 | Buti | ............................. | 711/108 |
| 2005/0128908 A1 * | 6/2005 | Shin et al. | ................. | 369/47.38 |

FOREIGN PATENT DOCUMENTS

| JP | 48-66334 | 9/1973 |
|---|---|---|
| JP | 2003-345530 | 12/2003 |

* cited by examiner

*Primary Examiner*—Fritz Alphonse
(74) *Attorney, Agent, or Firm*—Staas & Halsey LLP

(57) ABSTRACT

A disk controller includes a determining unit for determining whether check codes added to data read from a disk drive are first type check codes or second type check codes, and a check code conversion unit. The check code conversion unit includes conversion unit for converting, if the check codes added to the read data are first type check codes, the first type check codes into second type check codes and a writing unit for writing the data provided with the second type check codes into the disk drive. The disk controller also includes a control unit for performing background processing, which is performed at a time different from processing performed when a data read request or a data write request is sent from a host device, by reading data provided with check codes from the disk drive and by starting check code conversion processing performed by the check code conversion unit.

4 Claims, 10 Drawing Sheets

DISK CONTROLLER

BACKGROUND OF THE INVENTION

1. Field of the Invention

The present invention relates to a redundant array of independent disk (RAID) system, and a disk controller thereof having a function of converting check codes added to data stored in disk drives into new check codes.

2. Description of the Related Art

Hitherto, to ensure the data integrity, when writing data from a server to a disk drive, check codes are added to each block of the data, the data being input or output in units of data blocks. When reading data from a disk drive to a server, the consistency of the data with the check codes is checked to ensure the integrity of the data.

In a RAID device, for example, in case of disk failures, many disk drives are installed and data is redundantly stored in a plurality of disks. In the RAID device, in order to detect data abnormalities in the case of any disk failure, when writing data, check codes are added, and when reading the data, the consistency of the data with the check codes is checked to guarantee the integrity of the data.

When checking data, various check codes or checking formats were used dependent on individual companies. However, in response to an increasing demand for RAID devices, check codes or checking formats are now standardized and are used for various control chips.

FIG. 10 illustrates an example of data checking conducted in a RAID device 540 including a RAID controller 510 and a disk drive 520.

When writing data from a server 530 to the disk drive 520, check codes are added to the data by the RAID controller 510. It is now assumed that data is 512-byte block data and check codes are 8-byte block check codes (BCC). The RAID controller 510 temporarily stores data provided with check codes in a cache 511 and then writes the data from the cache 511 to the disk drive 520.

When reading data, the RAID controller 510 reads out data provided with check codes from the disk drive 520 to the cache 511 and then checks the consistency of the data with the check codes. If the integrity of the data is verified, the RAID controller 510 removes the check codes from the data and then transfers the resulting data to the server 530.

In an existing RAID device, to support a new interface (for example, when replacing an Fiber Channel 2Gbps interface by an Fiber Channel 4Gbps interface), it is necessary to install a disk controller having new chips.

In this case, if check codes are also changed, data stored in an existing disk drive cannot be correctly checked.

Additionally, the check logic of check codes is dependent on the hardware of a disk controller. Accordingly, replacing the hardware of the disk controller by new hardware may change the check logic. Accordingly, when supporting a new interface in an existing RAID device, it is necessary to convert check codes so that the data integrity can be correctly verified.

Japanese Unexamined Patent Application Publication No. 48-066334 discloses a technique for converting error correcting codes (ECC) into parities when transferring data between a memory and an input/output (I/O) interface. In this technique, check codes are converted when sending and receiving data between different media (for example, a memory and a transmission channel).

Japanese Unexamined Patent Application Publication No. 2003-345530 discloses a maintenance technique for a disk (RAID) system, and more specifically, a technique for converting data from a host into a data format that can be handled in the disk system.

SUMMARY OF THE INVENTION

According to one aspect of the present invention, there is provided a RAID system including a disk controller for controlling reading and writing of data provided with check codes from or into a disk drive of the RAID system.

The disk controller determines whether check codes added to data read from the disk drive are a first type (for example, old) check codes or a second type (for example, new) check codes, and converts the old check code into new check code upon determining the check code added to the read data being the old check code, and writes the data with the new check code into the disk device.

DESCRIPTION OF THE PREFERRED EMBODIMENTS

The present invention is described in detail below with reference to the accompanying drawings through illustration of a preferred embodiment.

Figure 1:
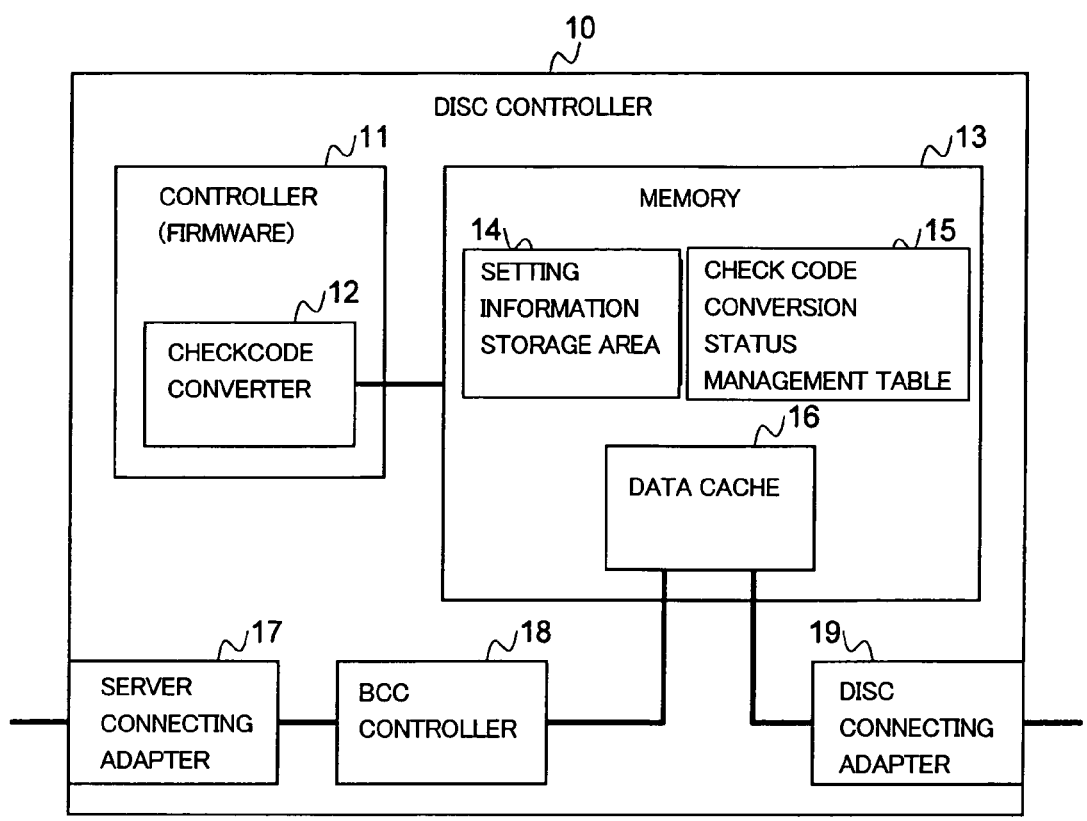
FIG. 1 is a block diagram illustrating an example of the configuration of a disk controller according to an embodiment of the present invention.

FIG. 1 is a block diagram illustrating an example of the configuration of a disk controller 10 according to an embodiment of the present invention. The disk controller 10 includes a controller 11, a memory 13, a server connecting adapter 17, a BCC controller 18, and a disk connecting adapter 19.

The controller 11, which is, for example according to the embodiment, firmware implemented by a central processing unit (CPU) and a program stored in a memory, includes a check code converter 12.

The memory 13 includes a setting information storage area 14, a check code conversion status management table 15, and a data cache 16.

The BCC controller 18 performs control on check codes by using new check codes. More specifically, when writing data, the BCC controller 18 adds second type (e.g., new) codes to data received from a server, and when reading data, the BCC controller 18 checks the consistency of the data with the new check codes to ensure the data integrity.

The check code converter 12 converts first type (e.g., old) check codes into new check codes on the occasion, for example, when the disk controller 10 reads or writes data from or into a disk drive in response to a request from the server, or when a disk patrol operation is executed in the background regardless of whether there is a request from the server, or when a background conversion processing different from a disk patrol operation is executed, or any combinations thereof.

A disk patrol operation is a function, executed in the background, regardless of whether there is data access from the server, by accessing every certain quantity of data stored in disk drives at regular intervals to check disk drives and to check the data consistency in a RAID system in order to enhance the data reliability in the RAID system.

In the disk controller 10, under the control of the controller 11, the disk connecting adapter 19 inputs data provided with check codes from a disk drive and stores it in the data cache 16 while, for example, a disk patrol operation is being executed in the background.

The check code converter 12 checks whether the check codes added to the data stored in the data cache 16 are old check codes or new check codes, and if they are found to be old check codes, the check code converter 12 converts the old check codes into new check codes after verifying the integrity of the data with the old check codes. The data provided with the new check codes is then output from the disk connecting adapter 19 to the disk drive.

During the operation, for data provided with old check codes read into the data cache 16 from a disk drive in response to a read request from the server, the old check codes are converted into new check codes in the data cache 16, and then, the resulting data provided with the new check codes is sent to the BCC controller 18.

The BCC controller 18 checks the consistency of the data with the added new check codes, and if the data integrity is verified, the BCC controller 18 outputs the data to the server through the server connecting adapter 17.

That is, for data provided with old check codes and stored in disk drives, the old check codes can be converted into new check codes in the data cache 16, and thus, the BBC controller 18 can check the integrity of data by using the new check codes.

The data provided with new check codes is also output from the data cache 16 to a disk drive through the disk connecting adapter 19.

In response to a write request from the server, the server connecting adapter 17 inputs data from the server into the BCC controller 18, and the BCC controller 18 adds new check codes to the data and stores the resulting data in the data cache 16. The data is then output from the data cache 16 to a disk drive through the disk connecting adapter 19.

In the check code conversion status management table 15, the old/new conversion status of check codes added to data stored in the disk drives is managed.

Check code conversion processing may be performed in various manners, such as conversion processing executed in the background (hereinafter referred to as "background conversion processing") or conversion processing executed in response to a read request from the server or the disk patrol processing executed in the background, or any combinations thereof.

In the setting information storage area 14, setting information concerning selected conversion processing is stored. The check code converter 12 performs check code conversion processing in accordance with the setting information while referring to or updating the check code conversion status management table 15.

According to the present invention, when it becomes necessary to change check codes due to, for example, the replacement of the BCC controller 18 in the disk controller 10, check codes added to data stored in disk drives can be converted without the need to stop the operation of the system. Additionally, since it is possible to convert check codes while suppressing a load on the operation of the system, a new interface, for example, a new FC interface that might require new disk controller chips, including different check codes, can be easily introduced to the system.

Figure 2:
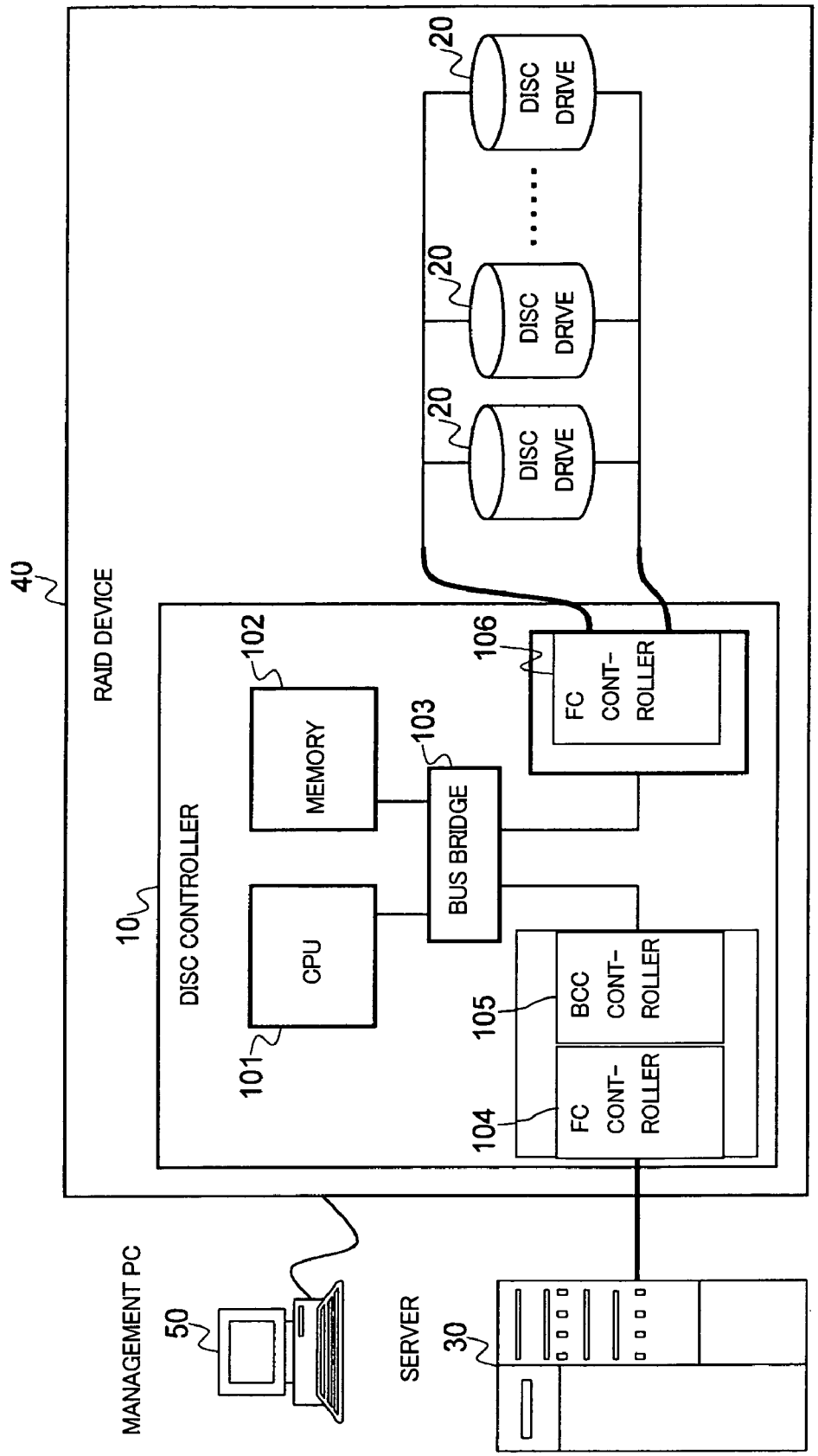
FIG. 2 is a block diagram illustrating an example of the hardware configuration of a RAID system according to an embodiment of the present invention.

FIG. 2 illustrates an example of the hardware configuration of a RAID system according to an embodiment of the present invention. The RAID system includes a server 30, a RAID device 40 for managing/storing data handled in the server 30, and a management computer (management PC) 50 for setting/managing the RAID device 40. The RAID device 40 includes a disk controller 10 having a RAID control function and a plurality of disk drives 20. The disk controller 10 is connected to the server 30 and the disk drives 20 through fiber channels (FC).

The disk controller 10 shown in FIG. 2 includes, as hardware, a CPU 101, a memory 102, a bus bridge 103, an FC controller 104, a BCC controller 105, and an FC controller 106, which implement the functional configuration of the disk controller 10 shown in FIG. 1.

The CPU 101 and the memory 102 shown in FIG. 2 correspond to the controller 11 and the memory 13, respectively, shown in FIG. 1. Interfaces of the disk controller 10 for the server 30 include the FC controller 104 and the BCC controller 105, while an interface of the disk controller 10 for the disk drives 20 includes the FC controller 106. The BCC controller 105 corresponds to the BCC controller 18 shown in FIG. 1.

It is now assumed that, in the RAID device 40 shown in FIG. 2, data provided with old check codes is stored in the disk drives 20.

In this example, the FC controller 104 and the BCC controller 105 are formed of a one-chip integrated circuit (IC), and the BCC controller 105 has the function of adding new check codes and checking the consistency of data with check codes.

Data sent from the server 30 is input into the disk controller 10 through the FC controller 104, and new check codes are added to the data in the BCC controller 105 and the resulting data is stored in the memory 102 and is written into the disk drive 20 through the FC controller 106. Data read from a disk drive 20 is input into the memory 102 through the FC controller 106, and cpu 101 checks check codes. If the data is provided with new check codes, the consistency of data with the new check codes is checked in the BCC controller 105. If the integrity of the data is verified, the resulting data is then output to the server 30 through the FC controller 104.

For data provided with old check codes stored in a disk drive 20, the old check codes should be converted into new check codes in a certain manner. In this case, to convert check codes without interrupting the operation of the system, in this embodiment, background conversion processing or conversion processing executed in response to a read request from the server is used.

If background conversion processing is executed at one time, conversion can be finished on all data within a certain period of time. On the other hand, the performance of the overall system can be decreased due to the overhead of background conversion processing.

In contrast, according to conversion processing executed in response to a read request from the server, the influence of the overhead of conversion processing on the performance of the overall system can be restricted only to reading data into the server. However, it can be difficult to predict when conversion on all data is finished.

For example, check codes are converted only in response to a read request from the server without performing background conversion processing, data without being converted remains in the disk drives 20 if there is no read request from the server.

In view of the above background, in this embodiment, not only the function of converting check codes in response to a read request from the server, but also the function of converting check codes while a disk patrol operation is being executed in the background or the function of performing background conversion processing different from a disk patrol operation, or any combination thereof are provided.

It can take more time to convert check codes of all data stored in the disk drives 20 by performing a disk patrol operation than to convert check codes of all data simultaneously in the background conversion mode. By performing a disk patrol operation, however, check codes can be converted without seriously imposing a burden on the system, and conversion processing can be finished within a limited period of time since conversion is conducted for every certain quantity of data.

Basically, it is preferable that check codes be converted in response to a read request from the server or while a disk patrol operation is being performed. The approach to performing data conversion, however, is different, such as, check code conversion is conducted only in response to a read request from the server or only when a disk patrol operation is being executed, or check codes of all data is converted simultaneously in the background, depending on the purpose in using the RAID device 40. Since each conversion method has advantages and disadvantages, the conversion method (check code conversion mode) can be selected according to the situation. The check code conversion method can be set manually and/or automatically. For example, a system administrator can set the check code conversion method by using the management PC 50.

Setting information concerning the check code conversion method is stored in the memory 102 (setting information storage area 14 shown in FIG. 1). The check code converter 12, which is firmware, converts check codes in accordance with the setting information.

Figure 3:
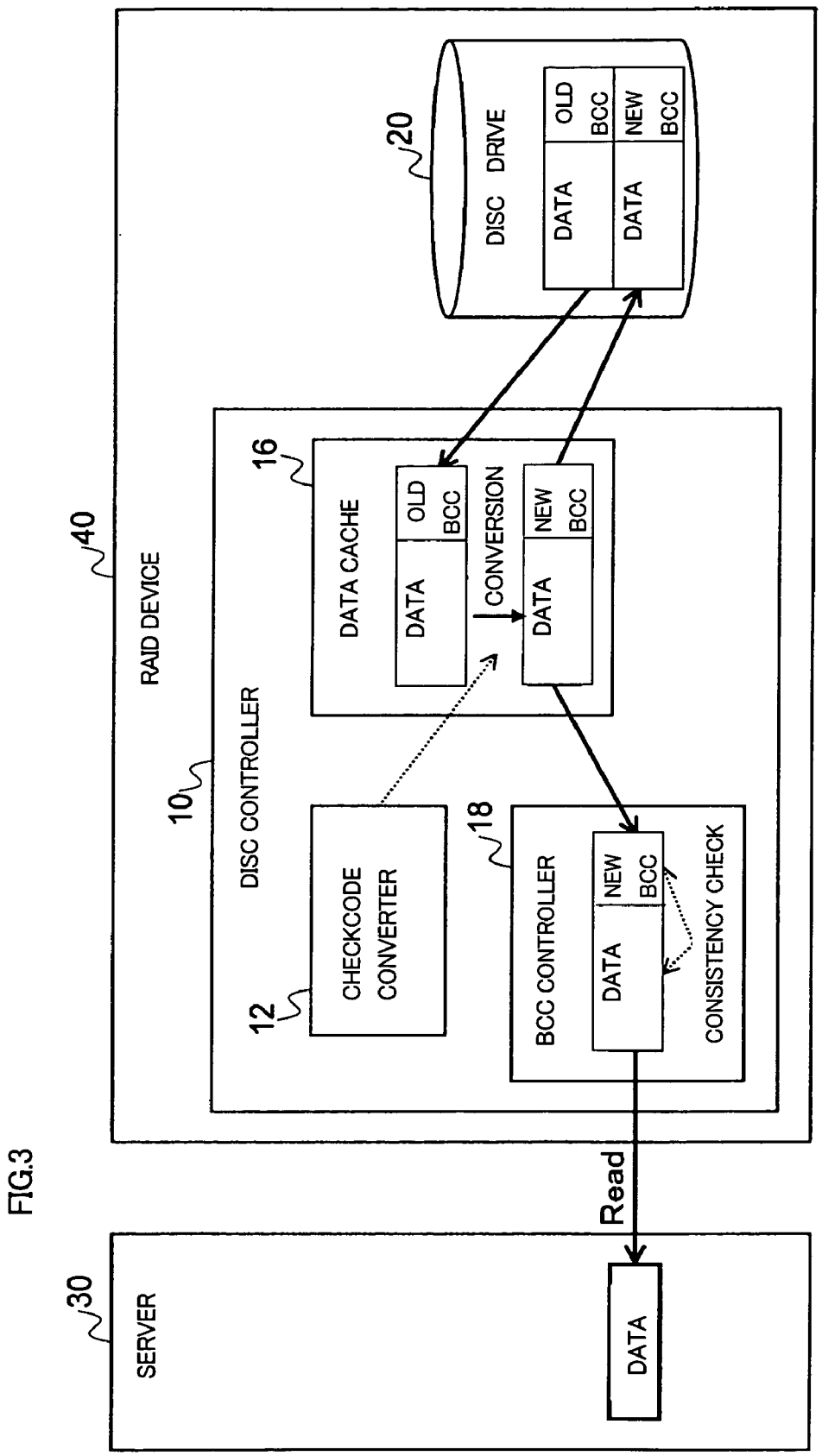
FIG. 3 illustrates a check code conversion method used in an embodiment of the present invention.

FIG. 3 illustrates a check code conversion method employed in this embodiment. In this example, check codes (BCC) are converted in response to a read request from the server 30.

In response to a read request from the server 30, the disk controller 10 reads data provided with old check codes (BCC) stored in the disk drive 20 to the data cache 16. The check code converter 12, which is firmware, determines whether the check codes are old or new, for example, by managing data check code conversion status, and/or by checking the consistency of the data with the old check codes, and if the data integrity is verified, the check code converter 12 converts the old check codes into new check codes (BCC) in the data cache 16.

The BCC controller 18 checks the consistency of the data with the new check codes, and if the data integrity is verified, the data is sent to the server 30. The data provided with the new check codes is also sent to the disk drive 20, and the check codes of the data stored in the disk drive 20 are updated to the new check codes.

Figure 4:
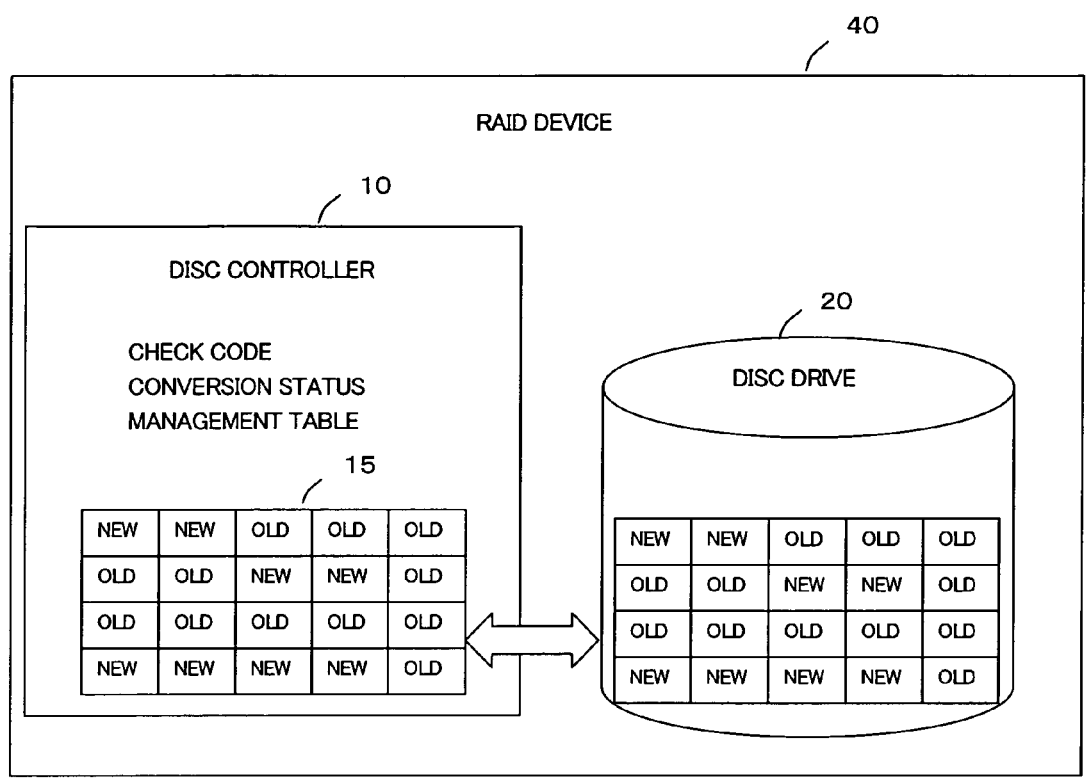
FIG. 4 illustrates the management of the check code conversion status in a disk drive, according to an embodiment of the present invention.

FIG. 4 illustrates the management of the check code conversion status in the disk drive 20. The check code conversion status (old/new) in the disk drive 20 is managed in the check code conversion status management table 15 created by controller 11 in the memory 13 of the disk controller 10. In the check code conversion status management table 15, information (BCC flags) concerning which data in the disk drive 20 have been converted (indicated by "new" in FIG. 4) and which data in the disk drive 20 have not been converted (indicated by "old" in FIG. 4) is recorded.

When data is read from the disk drive 20 into the data cache 16, the check code converter 12 checks with the check code conversion status management table 15 whether the check codes added to the read data have been converted, and if the check codes have not been converted, the check code converter 12 converts the check codes. After converting the check codes, the BCC flag associated with the converted data is updated to "converted" ("new" in FIG. 4).

When writing data, since data provided with new check codes is written into the disk drive 20, the BCC flag associated with the written data is updated by controller 11 ("new" in FIG. 4) in the check code conversion status management table 15.

The minimum unit of managing the conversion status (old/new) of data blocks in the check code conversion status management table 15 can be one block in the disk drive 20. If data is managed for each block, however, a very large capacity of the memory of the check code conversion status management table 15 is required depending on the capacity of the disk drive 20. Accordingly, one management unit in the check code conversion status management table 15 may be associated with a plurality of blocks. For example, the number of blocks checked in one disk patrol operation may be used as one management unit in the check code conversion status management table 15.

In this manner, by using information concerning the check code old/new conversion status, the status of the check codes added to the data stored in the disk drive 20 is managed, and it is checked for data accessed, for example, by the server 30 whether the associated check codes have been converted, and if the check codes have not been converted, they are converted into new check codes. As a result, check codes can be converted while the system is running.

Figure 5:
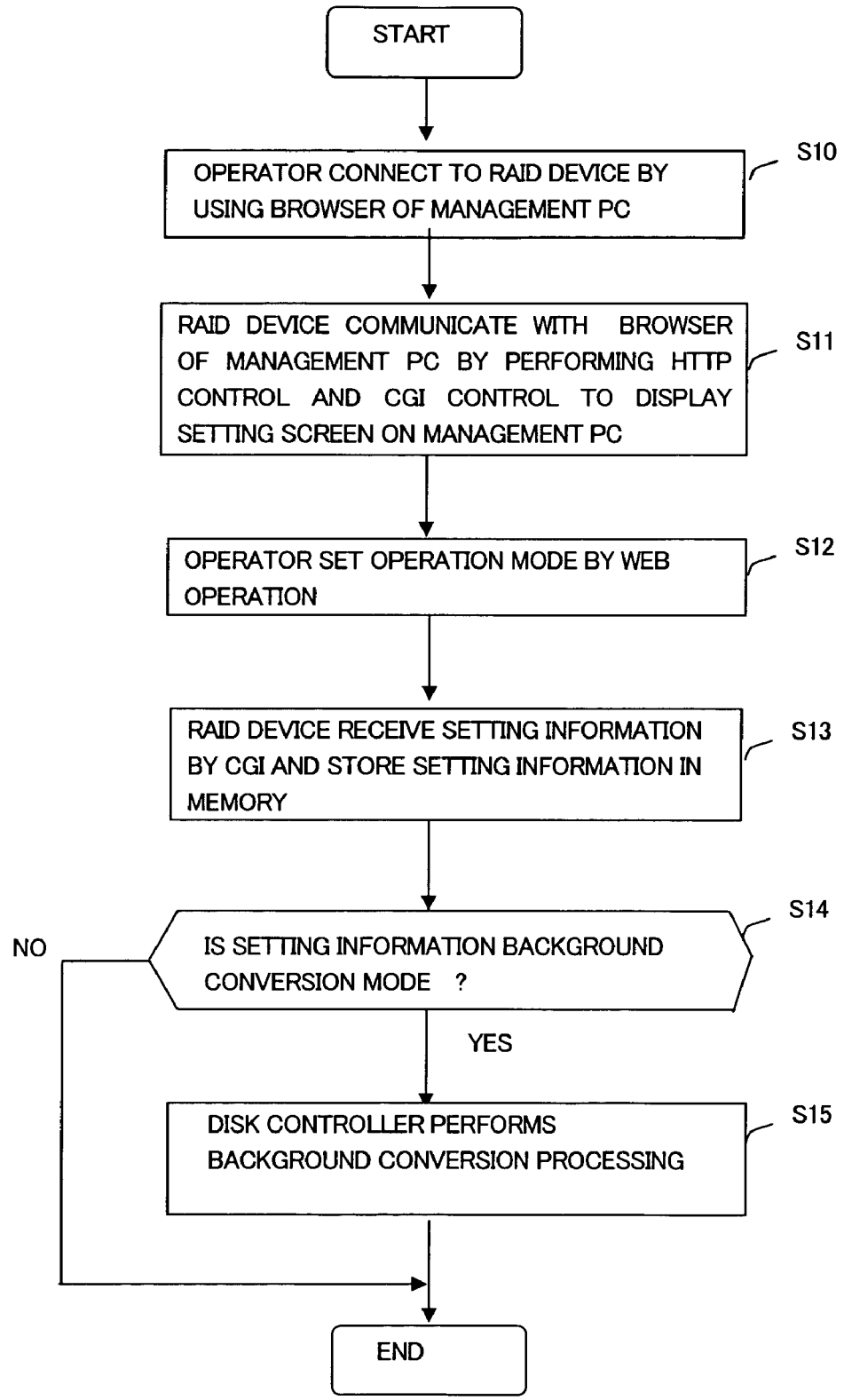
FIG. 5 is a flowchart illustrating setting processing in a disk system, according to an embodiment of the present invention.

FIG. 5 is a flowchart illustrating setting processing in the disk system.

Although various operation modes for converting check codes can be set by the operator (system administrator), for the sake of simplicity, in this embodiment, two operation modes, such as the normal conversion mode and the background conversion mode, are provided as the check code conversion operation modes. In the normal conversion mode, check codes are converted in response to a read request from the server or while a disk patrol operation is being performed. In the background conversion mode, check codes of all data are sequentially converted in the background processing.

In step S10, the operator connects to the RAID device 40 by using the browser of the management PC 50. Then, in step S11, the RAID device 40 communicates with the browser of the management PC 50 by performing hypertext transfer protocol (HTTP) control and common gateway interface (CGI) control so that a setting screen is displayed on the management PC 50.

In step S12, the operator sets the check code conversion operation mode, for example, the normal conversion mode or the background conversion mode, by a web operation. Then, in step S13, the RAID device 40 receives the setting information from the operator through a CGI and stores the information in the memory 102 (setting information storage area 14) of the disk controller 10. In step S14, the disk controller 10 checks the setting information stored in the setting information storage area 14 to determine whether the setting information stored in the setting information storage area 14 indicates the background conversion mode. If the setting information indicates the background conversion mode, the process proceeds to step S15 in which the disk controller 10 performs background conversion processing.

Figure 6:
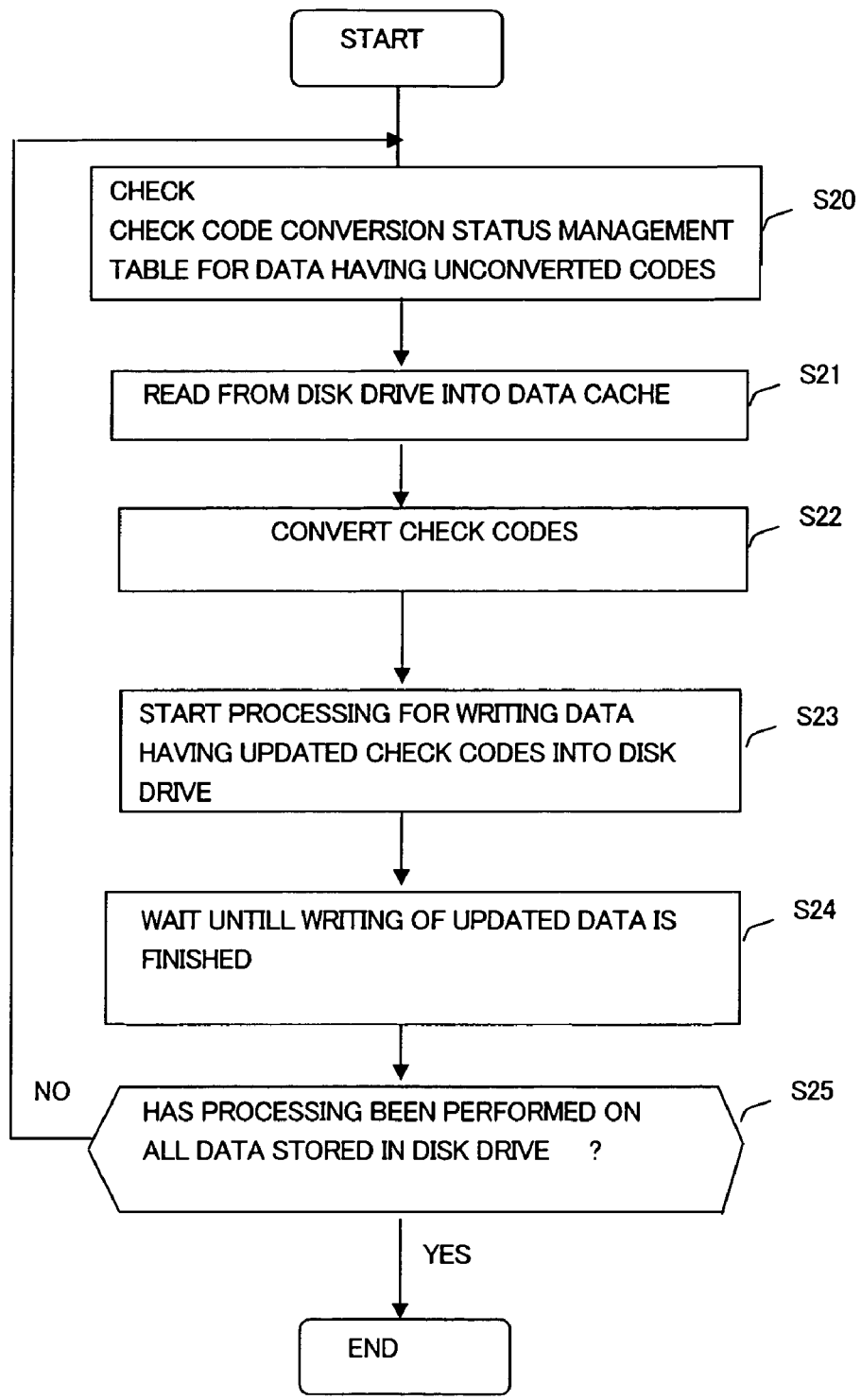
FIG. 6 is a flowchart illustrating background conversion processing performed by a disk controller, according to an embodiment of the present invention.

FIG. 6 is a flowchart illustrating background conversion processing executed by the disk controller 10 in step S15 in FIG. 5.

In step S20, the disk controller 10 checks the check code conversion status management table 15 for data having unconverted check codes.

Then, in step S21, the selected data is read from the disk drive 20 into the data cache 16. In step S22, the disk controller 10 checks whether the check codes added to the read data are correct, and, if the integrity of the data is verified, the disk controller 10 converts the check codes into new check codes. According to an aspect of the embodiments, the S22 data integrity verification of the read data with the old check codes can be optional.

If the consistency of the read data with the old check codes is not verified, the disk controller 10 outputs an error message or recovers the data.

Then, in step S23, the disk controller 10 starts processing for writing the updated data provided with the new check codes into the disk drive 20 (which is described below with reference to FIG. 8). In step S24, the disk controller 10 waits until the writing of the updated data is finished. The disk controller 10 then determines in step S25 whether the above-described processing has been performed on all data stored in the disk drives 20.

Upon receiving a read or write request from the server 30 while the background conversion processing is being executed, the background conversion processing can be interrupted, and the requested data is read or written preferentially. If the check codes added to the read data have not been converted, they are converted according to the check code conversion processing indicated by the flowchart in FIG. 7.

Figure 7:
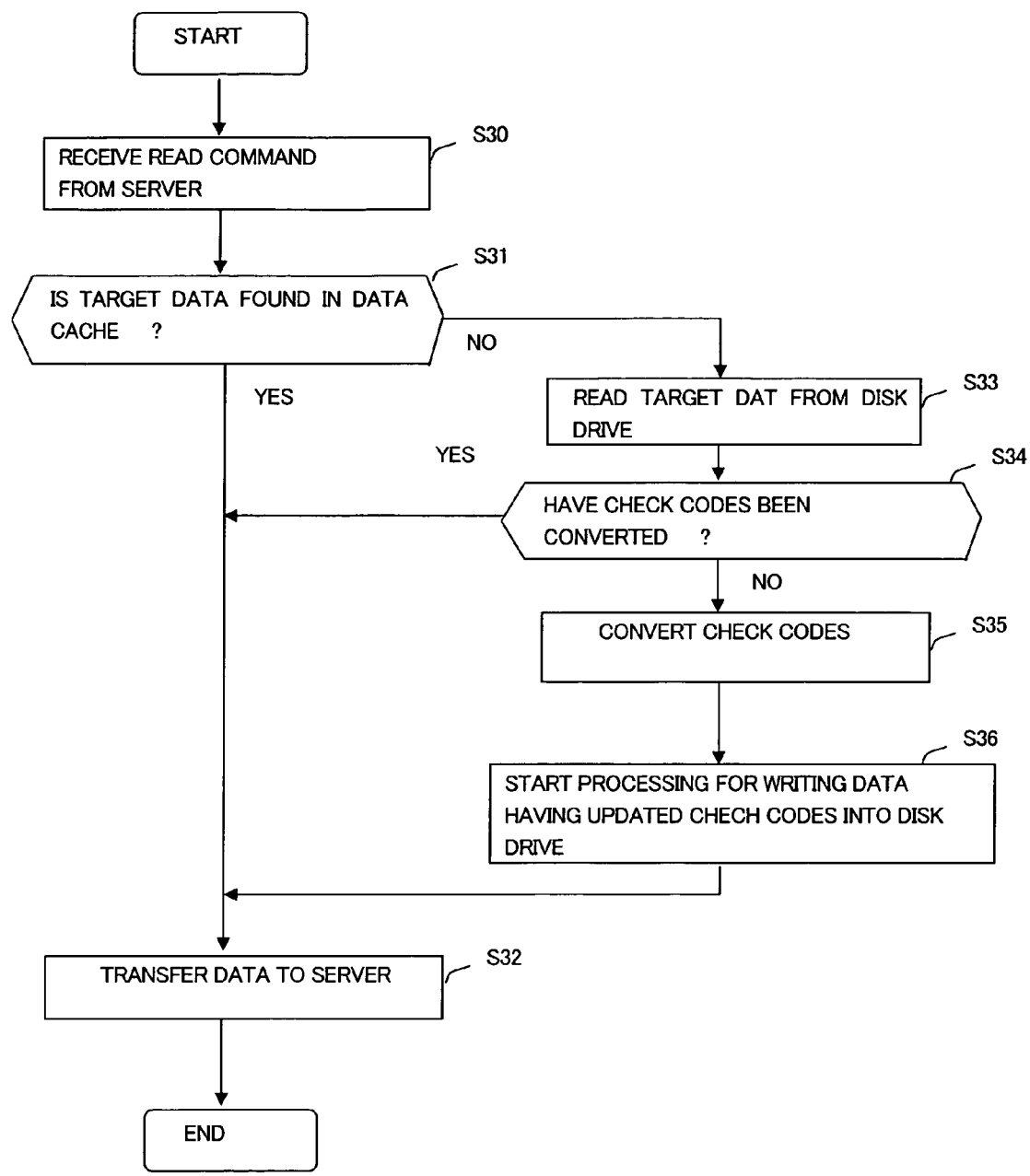
FIG. 7 is a flowchart illustrating check code conversion processing performed by the disk controller in response to a read request, according to an embodiment of the present invention.

FIG. 7 is a flowchart illustrating check code conversion processing by the disk controller 10 in response to a read request. In step S30, the disk controller 10 receives a read command from the server 30. Then, in step S31, the disk controller 10 checks the data cache 16 for the target data. If the target data is found in step S31, the disk controller 10 proceeds to step S32 to transfer the data to the server 30 because the data cache 16 stores the frequently-used data with new check codes of server 30. If the target data is not found in step S31, the disk controller 10 proceeds to step S33 to read the target data from the disk drive 20 and outputs it to the data cache 16. Then, in step S34, the disk controller 10 checks with the check code conversion status management table 15 whether the check codes added to the data have been converted. If the check codes have been converted, the disk controller 10 proceeds to step S32 to transfer the data to the server 30.

If it is found in step S34 that the check codes have not been converted, the process proceeds to step S35. In step S35, after checking the integrity of the data with the old check codes, the disk controller 10 converts the old check codes into new check codes. Then, in step S36, the disk controller 10 starts processing for writing the data having the updated check codes into the disk drive 20 (see FIG. 8). Then, the disk controller 10 proceeds to step S32 to transfer the data to the server 30.

Figure 8:
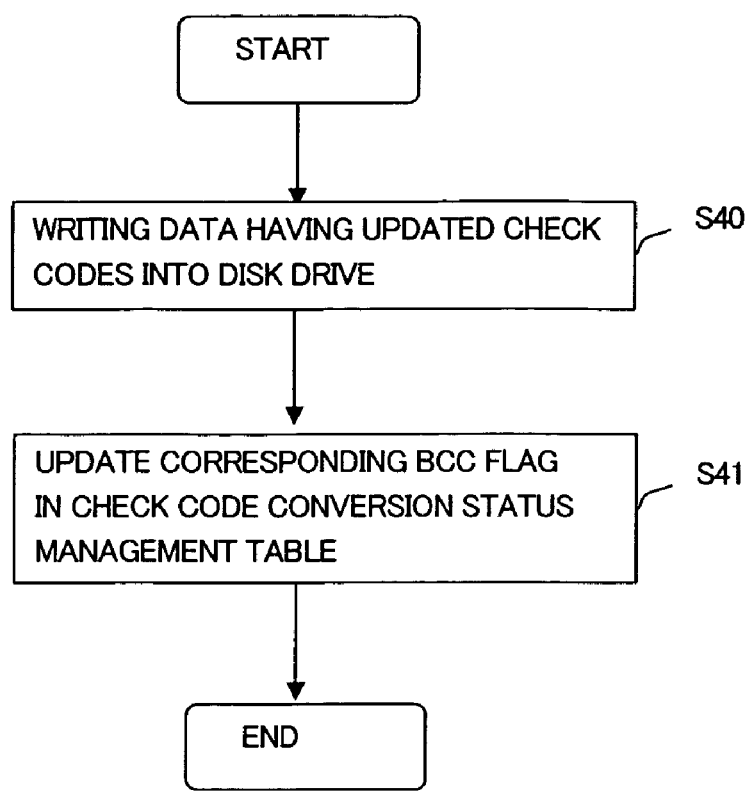
FIG. 8 is a flowchart illustrating processing for writing data provided with converted check codes into a disk drive, according to an embodiment of the present invention.

FIG. 8 is a flowchart illustrating the processing for writing updated data into the disk drive 20. In step S40, the disk controller 10 writes data provided with new check codes into the disk drive 20. Then, in step S41, the disk controller 10 updates the corresponding BCC flag in the check code conversion status management table 15 to "converted".

Figure 9:
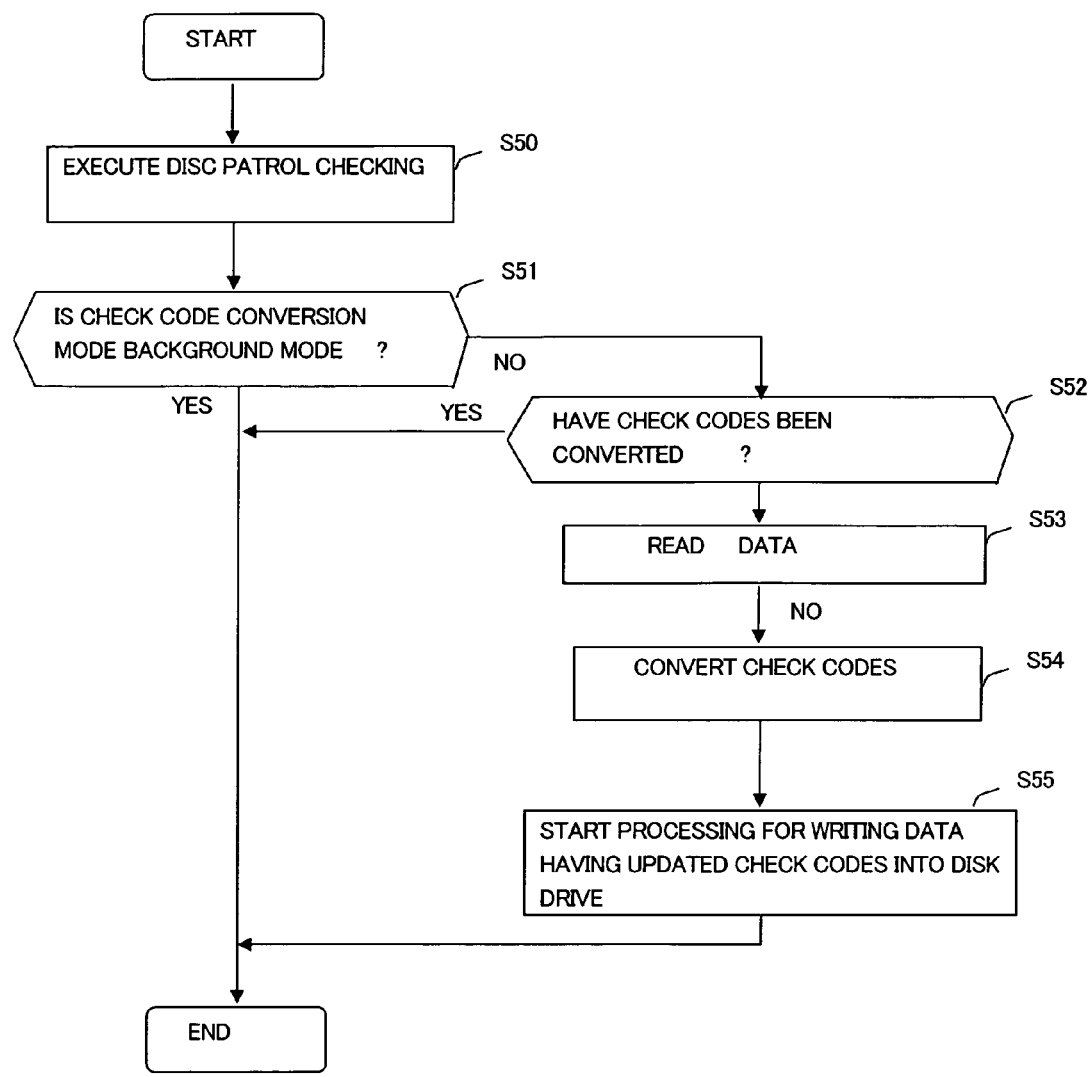
FIG. 9 is a flowchart illustrating check code conversion processing performed by the disk controller while a disk patrol operation is being performed, according to an embodiment of the present invention.
Figure 10:
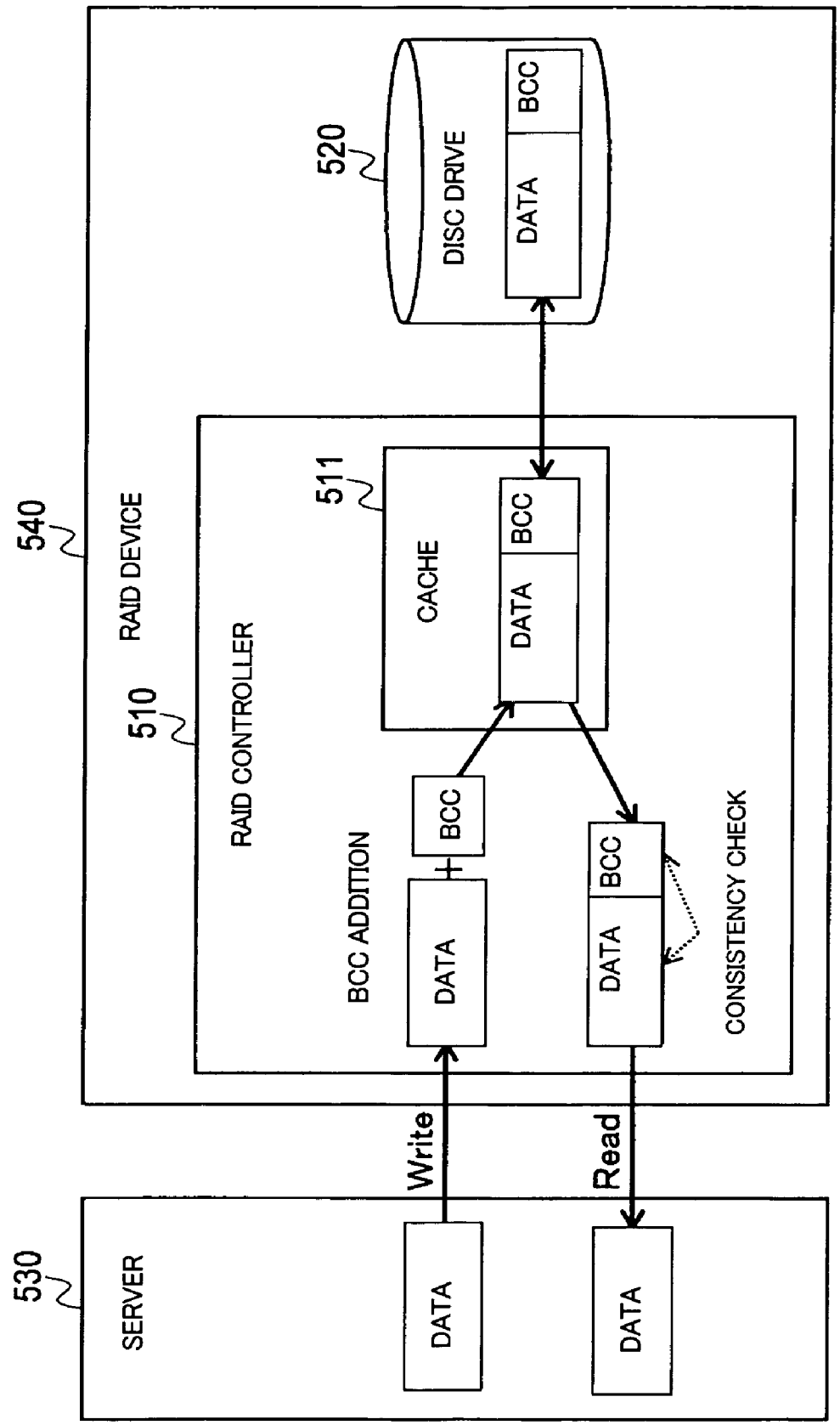
FIG. 10 is a block diagram illustrating an example of data checking conducted in a known RAID system.

FIG. 9 is a flowchart illustrating check code conversion processing by the disk controller 10 while a disk patrol operation is being performed.

In step S50, a disk patrol program is started at regular intervals, and then, the disk controller 10 executes disk patrol checking.

Then, in step S51, after disk patrol checking, the disk controller 10 checks the setting information stored in the setting information storage area 14 to determine whether the check code conversion operation mode is the background conversion mode or the normal conversion mode. If the operation mode is found to be the background conversion mode, the processing is terminated.

If the operation mode is found to be the normal conversion mode in step S51, the disk controller 10 proceeds to step S52 to check with the check code conversion status management table 15 whether the check codes added to the data have been converted. If the check codes have not been converted, the disk controller 10 proceeds to step S53 to read the corresponding data from the disk drive 20 and outputs it to the data cache 16. In step S54, after checking the integrity of the data with the old check codes, the disk controller 10 converts the old check codes added to the data into new check codes. Then, in step S55, the disk controller 10 starts processing for writing the updated data to the disk drive 20 (see FIG. 8).

When check codes of all data stored in the disk drives 20 have been converted according to the above-described processing, the firmware for check code conversion, and the setting information storage area 14 and the check code conversion status management table 15 in the memory 13 become unnecessary. Thus, the program and data can be eliminated from the disk controller 10, and then, if new firmware is installed, the disk controller 10 can perform regular access processing.

While the present invention has been described with reference to the exemplary embodiment, it is to be understood that the invention is not limited to the disclosed exemplary embodiments.

For example, the disk controller 10 can check with the check code conversion status management table 15 whether the check codes added to data read into the data cache 16 have been converted. Alternatively, the check code converter 12 may calculate check codes from data read into the data cache 16 to determine whether the check codes added to the data are old check codes or new check codes.

The many features and advantages of the embodiments are apparent from the detailed specification and, thus, it is intended by the appended claims to cover all such features and advantages of the embodiments that fall within the true spirit and scope thereof.

Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A disk controller controlling reading and writing of data provided with check codes from or into a disk drive, comprising:
   a programmed processor to control the disk controller according to a process including:
      setting, by an external control, a check code conversion operation mode selected from a first mode, a second mode, or a third mode, or any combinations thereof,
      determining whether check codes added to data read from the disk drive are first type check codes or second type check codes,
      converting the first type check code into the second type check code upon determining the check code added to the read data being the first type check codes, and
      writing the data with the second type check code into the disk device,
      wherein the programmed processor performs
         as the first mode the determining, the converting, and the writing in background at a time different from processing read/write requests from a host device,
         as the second mode the determining, the converting and the writing during a disk patrol operation to check the disk drive at regular intervals, and for a certain quantity of data for each disk patrol operation, and
         as the third mode performs the determining, the converting and the writing when data is read from the disk drive in response to a data read request from a host device.

2. The disk controller according to claim 1, further comprising a memory to store management information for managing status of data stored in the disk drive as to whether check codes added to the data are the first type check codes or the second type check codes, wherein the determining comprises checking the management information.

3. The disk controller according to claim 2, wherein a data management unit of the management information is a single data block, a plurality of data blocks, or a number of blocks checkable by a disk patrol, or any combinations thereof.

4. The disk controller according to claim 1, wherein when data is read from the disk drive in response to a data read request from the host device, the programmed processor starts the process on the read data.

* * * * *